US008616661B2

(12) United States Patent
Takata et al.

(10) Patent No.: US 8,616,661 B2
(45) Date of Patent: Dec. 31, 2013

(54) PORTABLE POWER DISTRIBUTION BOX (75) Inventors: Steven Matthew Takata, Minneapolis, MN (US); James Jerome Koberg, Morristown, MN (US); Brian Allen Amacher, Faribault, MN (US); Jason Robert DeMars, Faribault, MN (US); Christopher Alan Dahl, Prior Lake, MN (US)

(73) Assignee: Trystar, Inc., Faribault, MN (US)

( * ) Notice: Subject to any disclaimer, the term of this patent is extended or adjusted under 35 U.S.C. 154(b) by 195 days.

(21) Appl. No.: 13/315,743

(22) Filed: Dec. 9, 2011

(65) Prior Publication Data

US 2013/0146321 A1    Jun. 13, 2013

(51) Int. Cl.
*A47F 7/00* (2006.01)
(52) U.S. Cl.
USPC ..... 312/140; 312/257.1; 312/111; 312/265.1; 220/4.28; 174/50
(58) Field of Classification Search
USPC ............... 312/140, 257.1, 223.1, 223.2, 111, 312/265.1; 220/4.28, 4.33, 4.02; 174/50
See application file for complete search history.

(56) References Cited

U.S. PATENT DOCUMENTS

| 936,451 A | 10/1909 | Havenhill |
| 2,956,705 A | 10/1960 | Clingman |
| 3,380,768 A | 4/1968 | Wolfensberger |
| 3,751,127 A | 8/1973 | Black |
| 3,901,571 A | 8/1975 | Begitschke |
| 3,955,702 A * | 5/1976 | Lundy .......................... 220/4.28 |
| 4,115,655 A | 9/1978 | Prentice |
| 4,123,129 A | 10/1978 | Butler |
| 4,126,364 A | 11/1978 | Reilly |
| 4,322,572 A | 3/1982 | Snyder |
| 4,637,324 A | 1/1987 | Janson |
| 4,768,845 A | 9/1988 | Yeh |
| 4,846,078 A | 7/1989 | Janson |
| 4,884,715 A | 12/1989 | Pohlmann |
| 4,997,240 A * | 3/1991 | Schmalzl et al. .......... 312/265.4 |
| 5,070,429 A | 12/1991 | Skirpan |
| 5,470,139 A | 11/1995 | Hsiao |
| 6,062,664 A * | 5/2000 | Benner ...................... 312/265.1 |
| 6,832,580 B2 * | 12/2004 | Marchioro .................... 119/452 |
| 7,848,085 B2 | 12/2010 | Gerber |
| 7,922,417 B2 | 4/2011 | Jimenez |
| 8,403,431 B2 * | 3/2013 | Elkins et al. ................ 312/265.1 |
| 2010/0270299 A1 * | 10/2010 | Baltussen et al. ............ 220/4.33 |
| 2011/0163648 A1 | 7/2011 | Jimenez |

* cited by examiner

*Primary Examiner* — Stephen Castellano
(74) *Attorney, Agent, or Firm* — Fredrikson & Byron, P.A.

(57) ABSTRACT

An enclosure, in accordance with an embodiment of the invention, comprises a plurality of peripheral frame members, a plurality of corner frame members, a plurality of corner members, a plurality of primary surface sheets, and a plurality of secondary surface sheets. In preferred embodiments, the components of the enclosure are joined together in a manner that inhibits liquids from accessing the junctions between the components. In this manner, the interior of the enclosure can be shielded from various weather and other conditions.

12 Claims, 6 Drawing Sheets

PORTABLE POWER DISTRIBUTION BOX

TECHNICAL FIELD

This disclosure relates to a portable enclosure. More particularly, the disclosure relates to a portable electrical power distribution box.

BACKGROUND

Portable electrical power distribution systems are used for providing electrical power for various applications in which electrical power is not available. Conventional power distribution systems typically include a number of different electrical components such as circuit breakers, input and output connectors, indicator lights, etc. These electrical components are typically enclosed within a structure for safety and other reasons. The enclosure is then moved to an indoor or outdoor location where electrical power is needed for purposes such as an outdoor performance, outdoor stalls, the motion picture industry, convention and exhibit halls, etc.

Prior art teachings and attempts at providing portable power distribution boxes include U.S. Pat. Nos. 5,544,003, 5,202,538, and 7,848,085. However, each such attempt has significant drawbacks. Accordingly, there exists a need for a portable electrical power distribution box.

SUMMARY

An enclosure, in accordance with an embodiment of the invention, comprises a plurality of peripheral frame members (PFM), a plurality of corner frame members (CFM), a plurality of corner members, a plurality of primary surface sheets (PSS), and a plurality of secondary surface sheets (SSS). Each peripheral frame member includes a first and a second PFM channel, and two opposed PFM edges, wherein each PFM edge includes a first PFM alignment element and a PFM joining element. Each corner frame member includes two CFM channels and two opposed CFM edges, wherein each CFM edge includes a CFM alignment element and a CFM joining element. Each corner member includes a first and a second panel, wherein each panel includes an interior and an exterior surface, and is bounded by a corner edge, a free edge (FE) opposite said corner edge, and opposing interior and exterior panel edges. The free edge of each panel includes a first FE alignment element, an FE joining element, and an FE lip. The interior panel edge (IPE) of each panel includes an IPE lip. The interior panel edges of the first and second panel are contiguous and form a corner member interior edge (IE), and the IPE lips of the first and second panel are contiguous and form a corner member IE lip. The corner member interior edge includes an IE alignment element and an IE joining element. Each primary surface sheet includes four PSS edges, and forms a side of the enclosure by joining each primary surface sheet with four peripheral frame members, wherein the four PSS edges of each primary surface sheet are joined with the first PFM channel of the corresponding four peripheral frame members. Each secondary surface sheet includes two SSS peripheral edges and two SSS corner edges, and forms a side of the enclosure by joining each secondary surface sheet with two peripheral frame members and two corner frame members, wherein the two SSS peripheral edges are joined with the second PFM channel of the corresponding two peripheral frame members, and the two SSS corner edges are joined with one of the two CFM channels of the corresponding two corner frame members.

In an embodiment of the enclosure, each corner member is joined with two peripheral frame members at respective peripheral junctions (PJ) and with one corner frame member at a corner junction (CJ). At each peripheral junction, PFM alignment pins and/or rods are used for aligning the two first FE alignment elements of each corner member with the first PFM alignment elements of the corresponding peripheral frame member. Also at each peripheral junction, PFM rods and PFM fasteners are used for joining the two FE joining elements of each corner member with the PFM joining elements of the corresponding peripheral frame member. As such, the two FE lips of each corner member cover the respective peripheral junction to inhibit liquids from accessing the respective peripheral junction. At each corner junction, CFM alignment pins and/or rods are used for aligning the IE alignment element of each corner member with the CFM alignment element of the corresponding corner frame member, and CFM rods and CFM fasteners are used for joining the IE joining element of each corner member is joined with the CFM joining element of the corresponding corner frame member. As such, the two IPE lips of each corner member cover the corner junction to inhibit liquids from accessing the respective corner junction.

For further inhibiting liquids from accessing the peripheral junction and corner junction, some embodiments of the enclosure include a plurality of PJ gaskets and a plurality of CJ gaskets, wherein each PJ gasket is positioned in each peripheral junction between the corner member and the corresponding peripheral frame member, and each CJ gasket is positioned between the corner member and the corresponding corner frame member. In other embodiments of the enclosure, the free edge of each of the first and second panels of each corner member includes an FE rib pressed against the PJ gasket, and the interior edge of each corner member includes an IE rib pressed against the CJ gasket. Some embodiments can include an FE rib and/or an IE rib without corresponding gaskets, meaning that the FE ribs press directly against PFM edges, and the IE ribs press directly against a CFM edge. Such embodiments can further inhibit liquid from entering the enclosure because of the compressibility of the ribs.

In some embodiments of the corner member, the exterior surface of the first panel includes an outer nesting structure, and the exterior surface of the second panel includes an inner nesting structure. The inner and outer nesting structures are sized and arranged such that when a first enclosure is stacked upon a second enclosure, the two inner nesting structures of the first enclosure nest in the two outer nesting structures of the second enclosure, and the two inner nesting structures of the second enclosure nest in the two outer nesting structures of the first enclosure. In an embodiment of the enclosure, a first set of diagonally opposite corner members on a first side of the enclosure have the inner nesting structures, and a second set of diagonally opposite corner members, different from the first set of diagonally opposite corner members, on the first side of the enclosure have the outer nesting structures.

In an embodiment of the enclosure, each PFM edge includes a second PFM alignment element, and each one of the two corresponding free edges of each corner member also includes a second FE alignment element. Then, at each peripheral junction, PFM alignment pins and/or rods are used for aligning the two second FE alignment elements of each corner member with the second PFM alignment elements of the corresponding peripheral frame member.

In some embodiments, the present invention can be an enclosure. As with other embodiments, the enclosure can include peripheral frame members, corner frame members, corner members, primary surface sheets, and secondary surface sheets. Similarly, the peripheral frame members can be joined with the corner members at peripheral junctions, and the corner frame members can be joined with the corner members at corner junctions. In preferred embodiments, the present invention can include peripheral junction covers and corner junction covers. There can be enough peripheral junction covers to cover each peripheral junction (sixteen in preferred embodiments). Likewise, there can be enough corner junction covers to cover each corner junction (eight in preferred embodiments). The peripheral junction covers can be integral with the corner members and/or integral with corresponding gaskets that are inserted into the peripheral junctions and/or integral with the peripheral frame members and/ or a separate structure for covering the peripheral junctions. The corner junction covers can be integral with the corner members and/or integral with corresponding gaskets that are inserted into the corner junctions and/or integral with the corner frame members and/or a separate structure for covering the corner junctions.

Other aspects, features, and advantages will be apparent from the following detailed description, including the drawings and the claims.

BRIEF DESCRIPTION OF FIGURES

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF ILLUSTRATIVE EMBODIMENTS

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Figure 1:
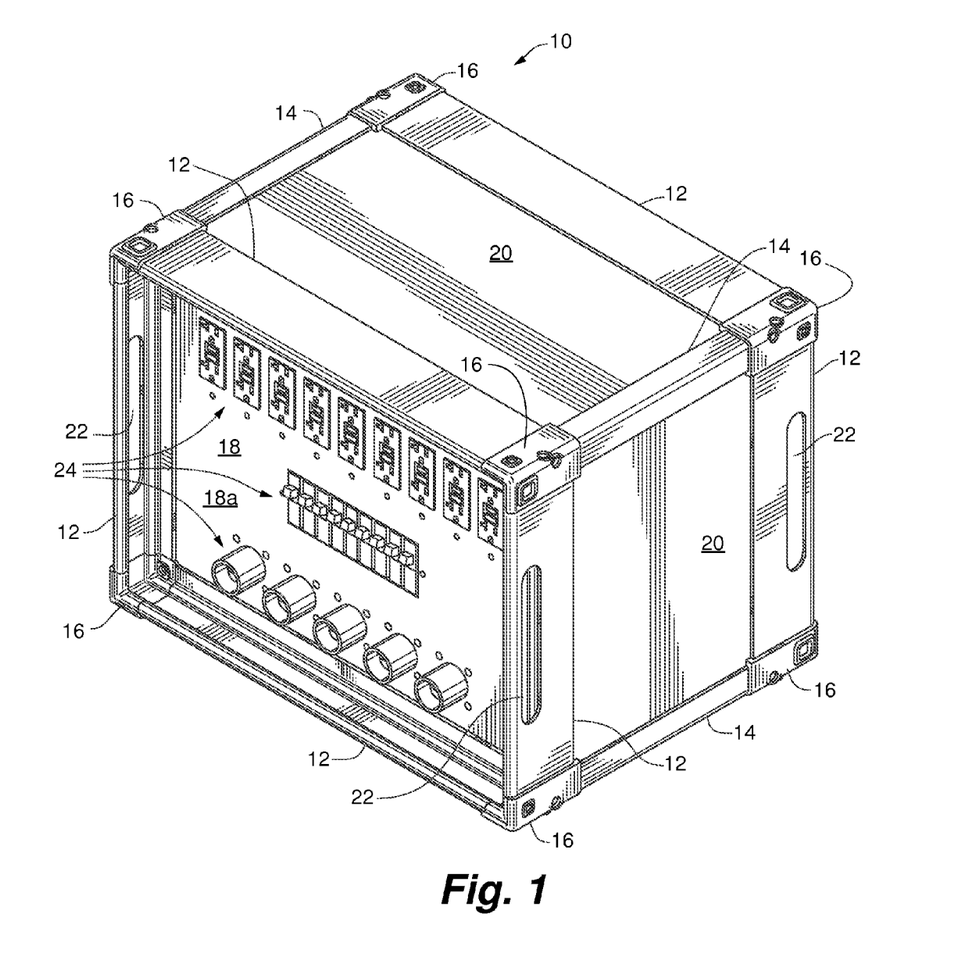
FIG. 1 is a perspective view of an embodiment of a fully assembled portable enclosure.

FIG. 1 is a perspective view of a fully assembled enclosure 10 in accordance with an embodiment of the instant invention. Enclosure 10 comprises eight peripheral frame members (PFM) 12, four corner frame members (CFM) 14, eight corner members 16, two primary surface sheets (PSS) 18, and four secondary surface sheets (SSS) 20. As shown, each corner member 16 is a connector for joining (or connecting or attaching) together two peripheral frame members 12 and one corner frame member 14 to form a corner of enclosure 10. As such, an assembled set of eight peripheral frame members 12, four corner frame members 14 and eight corner members 16 forms a frame of enclosure 10. Also as shown, and as described elsewhere, the sides of enclosure 10 are formed by joining each primary surface sheet 18 to four peripheral frame members 12, and by joining each secondary surface sheet 20 to two peripheral frame members 12 and two corner frame members 14.

While enclosure 10 is illustrated as a rectangular parallelepiped, it should be apparent that a polyhedron enclosure of any size can be provided using appropriately sized peripheral frame member 12 and corner frame member 14, and primary surface sheet 18 and secondary surface sheet 20. Accordingly, peripheral frame member 12 and corner frame member 14, in an embodiment of the invention, are extrudates which can be cut to desired lengths prior to assembly. As such, a first set of four peripheral frame members 12 having the same first length and a second set of four peripheral frame members 12 having the same second length different from the first length are used for a rectangular shaped parallelepiped such as enclosure 10 illustrated in FIG. 1. In another embodiment of enclosure 10, each one of the eight peripheral frame members 12 are of the same length.

In FIG. 1, enclosure 10 is illustrated as a portable electrical power distribution box wherein primary surface sheet 18a is illustrated having a plurality of electrical components 24 such as sockets, switches and connectors. Although not illustrated, one or more electrical components 24 can be included on the other primary surface sheet opposite primary surface sheet 18a and/or on one or more secondary surface sheet 20. In alternate embodiments, primary surface sheet 18a includes additional and/or fewer and/or different electrical components. It should also be understood that embodiments of enclosure 10 can be used in any orientation. Though the electrical components 24 are shown on primary surface sheet 18a, they could be on any of the secondary surface sheets 20. In another embodiment of the invention, enclosure 10 is a server box or a repeater box in a computer network. In some such embodiments, the enclosure 10 can be essentially "dust proof." Such dust proof embodiments can be particularly useful for enclosing computer equipment in factory-type environments (a display monitor may sit on top of the enclosure). In yet another embodiment of the invention, enclosure 10 is a storage box with or without one or more access panels and/or doors on the one or more primary surface sheet 18 and/or secondary surface sheet 20. Enclosures according to embodiments of the present invention can be, for example, speaker boxes, and so on.

In some embodiments, the peripheral frame members 12 provide functionality in addition to holding enclosure 10 together. For example, in some embodiments, slots 22 are provided in opposing peripheral frame members 12. Slots 22 are configured for grasping and lifting enclosure 10. In another example, the peripheral frame members 12 can overhang the surface of the primary surface sheet 18. In such embodiments, the overhang of the peripheral frame members 12 can (at least to some degree) shield the electrical components 24 from rain or other weather conditions and/or can protect the electrical components from certain kinds of impacts.

Figure 2A:
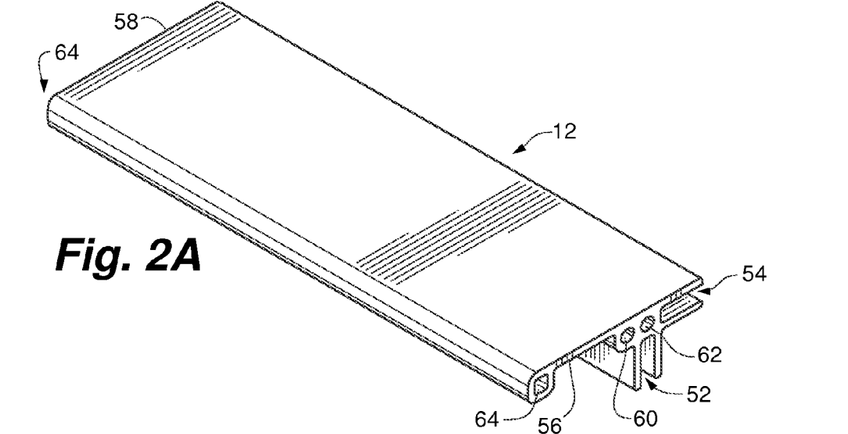
FIG. 2A is a perspective view of an embodiment of a peripheral frame member for the enclosure of FIG. 1.
Figure 2B:
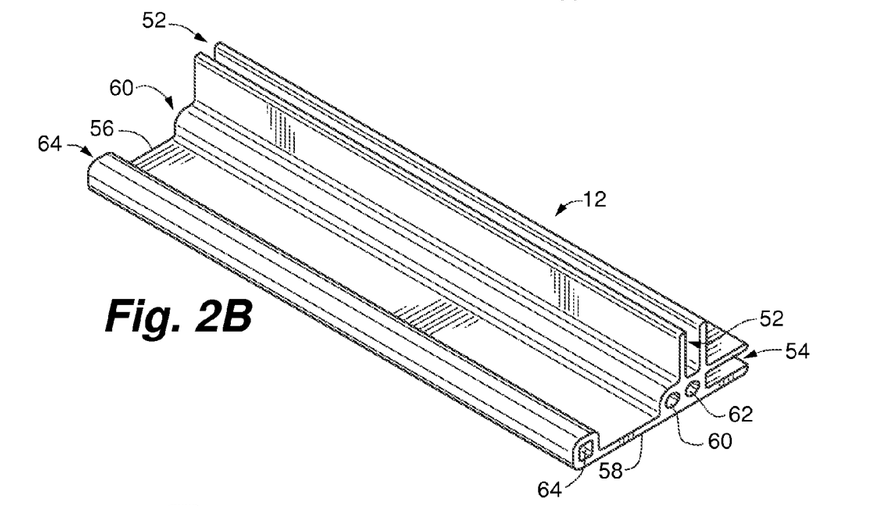
FIG. 2B is another perspective view of the peripheral frame member of FIG. 2A.
Figure 2C:
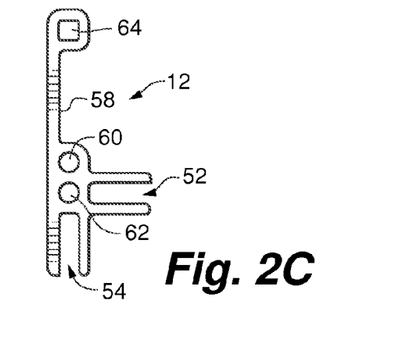
FIG. 2C is an end view of the peripheral frame member of FIG. 2A.

FIGS. 2A and 2B are perspective views of an embodiment of peripheral frame members 12, and FIG. 2C is an end view thereof. As illustrated, each peripheral frame member 12 includes a first PFM channel 52 and a second PFM channel 54 extending between two opposed PFM edges 56 and 58. As described elsewhere, first channel 52 is used for joining each peripheral frame member 12 to at least one primary surface sheet 18, and second PFM channel 54 is used for joining each peripheral frame member 12 to at least one secondary surface sheet 20. As shown, each PFM edge 56 and 58 includes at least one first PFM alignment element 60 and at least one PFM joining element 62. First PFM alignment element 60 and PFM joining element 62 facilitate the alignment and joining of PFM edge 56 or 58 and at least a portion of corner member 16. In an alternate embodiment of peripheral frame member 12, each PFM edge 56 and 58 includes only one of either first PFM alignment element 60 or PFM joining element 62 which, singularly, serves the dual purpose of both aligning and joining peripheral frame member 12 and at least a portion of corner member 16. While each first PFM alignment element 60 and PFM joining element 62 is illustrated as a cylindrical hole with a circular cross-section, alternate forms, shapes, cross-sections, etc., are considered as falling within the metes and bounds of the instant invention. For instance, the cross-section of first PFM alignment element 60 and/or PFM joining element 62 can be square, rectangular, elliptical, etc. Alternately, first PFM alignment element 60 can be a protrusion extending from a surface of PFM edge 56 and/or 58 and configured for engagement in a mating receiver in corner member 16 (or vice versa, with the corner member 16 having the protrusion and the PFM edge 56 and/or 58 having the mating receiver). In an embodiment of peripheral frame member 12, first PFM alignment element 60 and/or PFM joining element 62 extend a short distance into peripheral frame member 12 from each PFM edge 56 and 58. In an alternate embodiment, first PFM alignment element 60 and/or PFM joining element 62 are hollow cylinders extending between PFM edges 56 and 58. All alternate embodiments of first PFM alignment element 60 and PFM joining element 62 are considered as falling within the spirit, scope and intent of the instant invention.

In some embodiments of enclosure 10, first PFM alignment element 60 and PFM joining element 62 are functionally interchangeable. That is, in some enclosures 10, first PFM alignment element 60 is used as PFM joining element 62 while PFM joining element 62 is used as first PFM alignment element 60. This will become more apparent in light of the description for corner member 16 herein below with reference to FIGS. 4A-4C, 5 and 6.

In an embodiment of peripheral frame member 12, each PFM edge 56 and 58 also includes at least one second PFM alignment element 64 to further facilitate the alignment of peripheral frame member 12 and at least a portion of corner member 16. While second PFM alignment element 64 is illustrated as a cylindrical hole with a circular cross-section, alternate forms, shapes, cross-sections, etc., are considered as falling within the metes and bounds of the instant invention. Alternately, second PFM alignment element 64 can be a protrusion extending from a surface of PFM edge 56 and/or 58 and configured for engagement in a mating receiver in corner member 16 (or vice versa, with the corner member 16 having the protrusion and the PFM edge 56 and/or 58 having the mating receiver). In an embodiment of peripheral frame member 12, second PFM alignment element 64 is a hollow cylinder extending between PFM edges 56 and 58. In an alternate embodiment, second PFM alignment element 64 extends a short distance from each PFM edge 56 and 58. All alternate embodiments of second PFM alignment element 64 are considered as falling within the spirit, scope and intent of the instant invention.

Figure 3A:
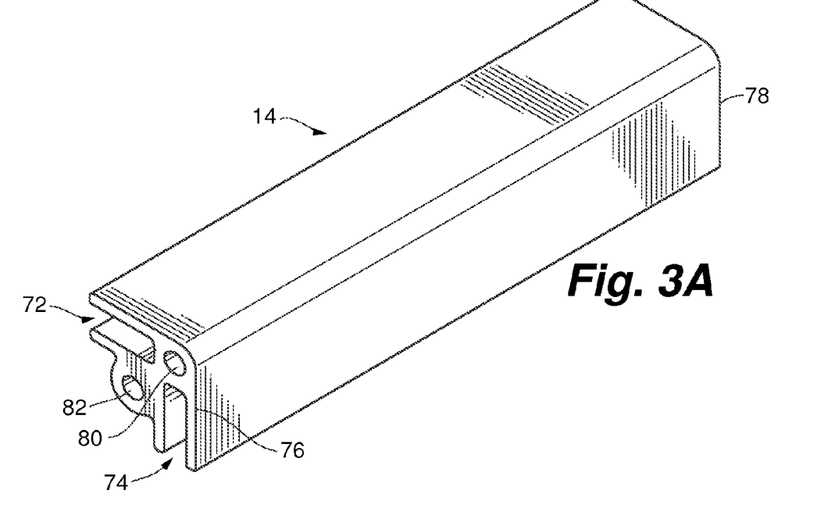
FIG. 3A is a perspective view of an embodiment of a corner frame member for the enclosure of FIG. 1.
Figure 3B:
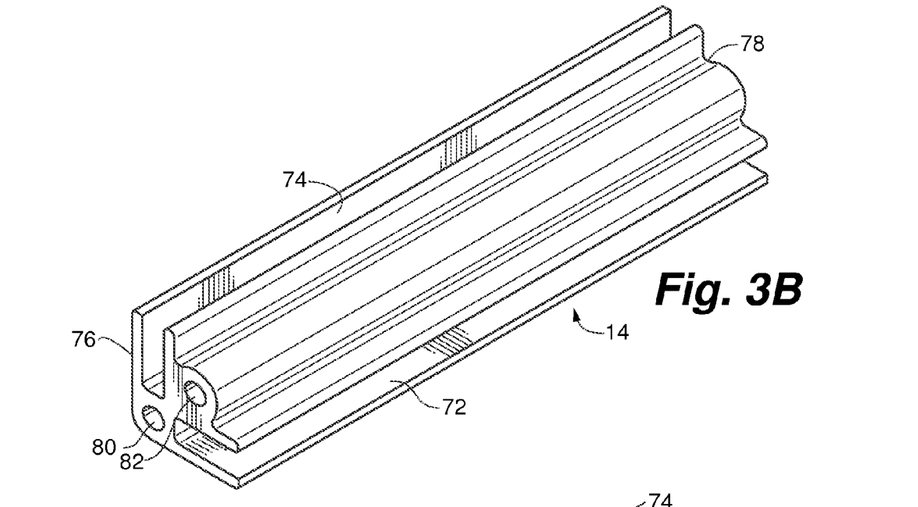
FIG. 3B is another perspective view of the corner frame member of FIG. 3A.
Figure 3C:
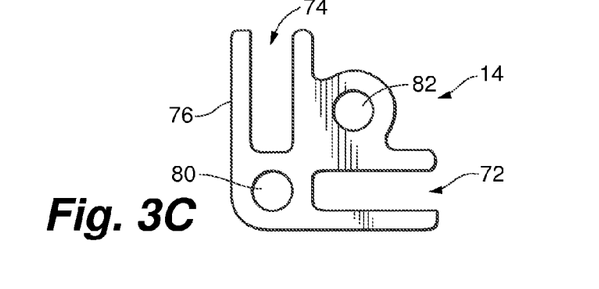
FIG. 3C is an end view of the corner frame member of FIG. 3A.

FIGS. 3A and 3B are perspective views of an embodiment of corner frame member 14, and FIG. 3C is an end view thereof. As illustrated, each corner frame member 14 includes two CFM channels 72 and 74 extending between two opposed CFM edges 76 and 78. As described elsewhere, each corner frame member 14 is joined to two secondary surface sheet 20 by joining CFM channel 72 to one of the two secondary surface sheet 20 and joining CFM channel 74 to the other secondary surface sheet 20. As shown, each CFM edge 76 and 78 includes at least one CFM alignment element 80 and at least one CFM joining element 82. CFM alignment and joining elements 80 and 82 facilitate the alignment and joining of CFM edge 76 or 78 and at least a portion of corner member 16. In an alternate embodiment of corner frame member 14, each CFM edge 76 and 78 includes only one of either CFM alignment element 80 or CFM joining element 82 which, singularly, serves the dual purpose of both aligning and joining corner frame member 14 and at least a portion of corner member 16. While each CFM alignment element 80 and CFM joining element 82 is illustrated as a cylindrical hole with a circular cross-section, alternate forms, shapes, cross-sections, etc., are considered as falling within the metes and bounds of the instant invention. For instance, the cross-section of CFM alignment element 80 and/or CFM joining element 82 can be square, rectangular, elliptical, etc.

Alternately, CFM alignment element 80 can be a protrusion extending from a surface of CFM edge 76 and/or 78 and configured for engagement in a mating receiver in corner member 16 (or vice versa, with the corner member 16 having the protrusion and the CFM edge 76 and/or 78 having the mating receiver). In an embodiment of corner frame member 14, CFM alignment and joining elements 80 and 82 are hollow cylinders, each extending between CFM edges 76 and 78. In an alternate embodiment, CFM alignment and joining elements 80 and 82 each extend a short distance from each CFM edge 76 and 78. All alternate embodiments of CFM alignment and joining elements 80 and 82 are considered as falling within the spirit, scope and intent of the instant invention.

Figures 4A, 4C:
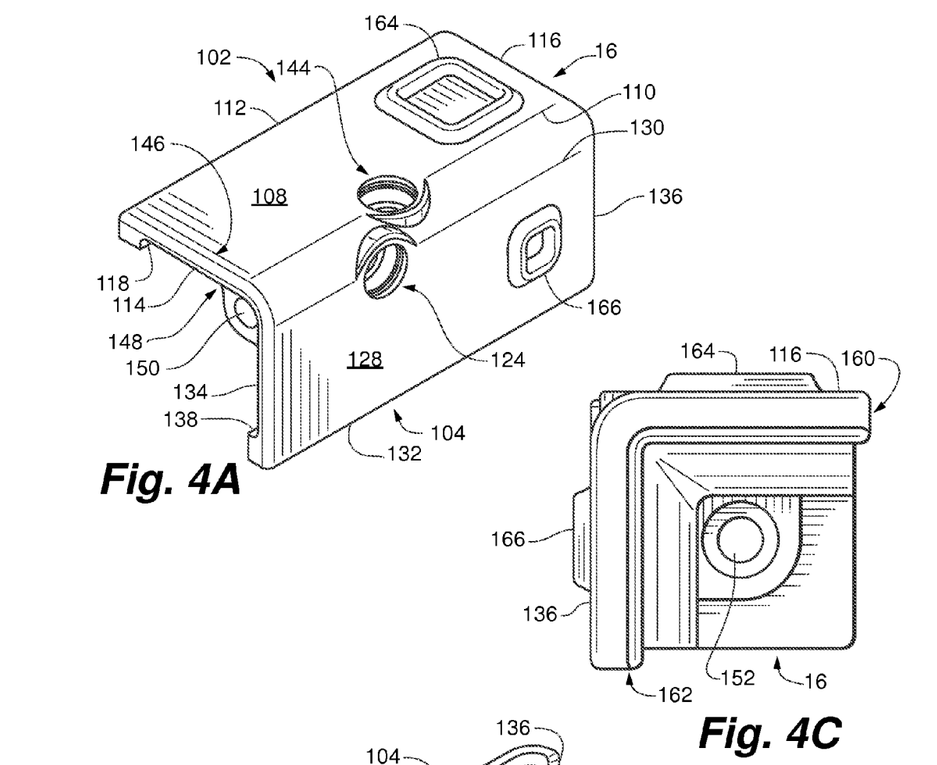
FIG. 4A is a perspective view of an embodiment of a corner member for the enclosure of FIG. 1.
FIG. 4C is an end view of the corner member of FIG. 4A.
Figure 4B:
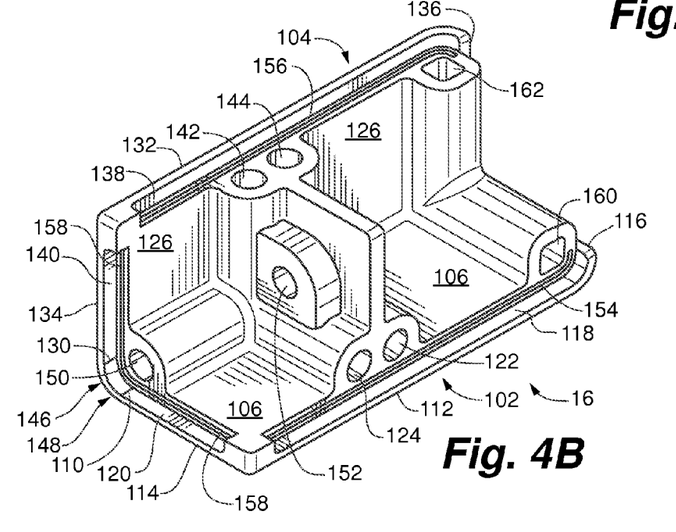
FIG. 4B is another perspective view of the corner member of FIG. 4A.

FIGS. 4A and 4B are perspective views of an embodiment of corner member 16, and FIG. 4C is an end view thereof. As illustrated, each corner member 16 includes first and second panels 102 and 104, respectively. In an embodiment of corner member 16, first panel 102 includes interior and exterior surfaces 106 and 108, respectively, and is bounded by corner edge 110, opposed free edge (FE) 112 opposite corner edge 110, interior panel edge (IPE) 114 and exterior panel edge 116 opposite interior panel edge 114. Near exterior surface 108, first panel 102 includes FE lip 118 extending from free edge 112 and generally parallel with exterior surface 108. Similarly, near exterior surface 108, first panel 102 includes IPE lip 120 extending from interior panel edge 114 and generally parallel with exterior surface 108.

As shown, free edge 112 includes at least one first FE alignment element 122 and at least one FE joining element 124. In an embodiment of corner member 16, first FE alignment element 122 and FE joining element 124 are respectively substantially similar to, and align with, first PFM alignment element 60 and PFM joining element 62 when PFM edge 56 or 58 is placed in FE lip 118. Accordingly, first FE alignment element 122 and FE joining element 124 and first PFM alignment element 60 and PFM joining element 62 facilitate the alignment and joining of corner member 16 and peripheral frame member 12 at free edge 112 and PFM edge 56 or 58. In an alternate embodiment of corner member 16, free edge 112 includes only one of either first FE alignment element 122 or FE joining element 124 which, singularly, serves the dual purpose of both aligning and joining corner member 16 and peripheral frame member 12 at free edge 112 and PFM edge 56 or 58. In another embodiment of corner member 16, first FE alignment element 122 and/or FE joining element 124 are configured for receiving and/or engaging first PFM alignment element 60 protruding from a surface of PFM edge 56 and/or 58. In yet another embodiment of corner member 16, FE joining element 124 extends through second panel 104. While each first FE alignment element 122 and FE joining element 124 is illustrated as a cylindrical hole with a circular cross-section, alternate forms, shapes, cross-sections, etc., are considered as falling within the metes and bounds of the instant invention. In some embodiments of corner member 16, first FE alignment element 122 and FE joining element 124 are substantially similar to one another. In other embodiments of corner member 16, first FE alignment element 122 differs from FE joining element 124.

In the embodiment of corner member 16 illustrated in FIGS. 4A-4C, second panel 104 is substantially similar to first panel 102. Accordingly, second panel 104 includes interior and exterior surfaces 126 and 128, respectively, and is bounded by corner edge 130, opposed free edge 132 opposite corner edge 130, interior panel edge 134 and exterior panel edge 136 opposite interior panel edge 134. Near exterior surface 128, second panel 104 includes FE lip 138 extending from free edge 132 and generally parallel with exterior surface 128. Similarly, near exterior surface 128, second panel 104 includes IPE lip 140 extending from interior panel edge 134 and generally parallel with exterior surface 128.

As shown, free edge 132 includes at least one first FE alignment element 142 and at least one FE joining element 144. In an embodiment of corner member 16, first FE alignment element 142 and FE joining element 144 are respectively substantially similar to, and align with, first PFM alignment element 60 and PFM joining element 62 when PFM edge 56 or 58 is placed in FE lip 138. Accordingly, first FE alignment element 142 and FE joining element 144 and first PFM alignment element 60 and PFM joining element 62 facilitate the alignment and joining of corner member 16 and peripheral frame member 12 at free edge 132 and PFM edge 56 or 58. In an alternate embodiment of corner member 16, free edge 132 includes only one of either first FE alignment element 142 or FE joining element 144 which, singularly, serves the dual purpose of both aligning and joining corner member 16 and peripheral frame member 12 at free edge 132 and PFM edge 56 or 58. In another embodiment of corner member 16, first FE alignment element 142 and/or FE joining element 144 are configured for receiving and/or engaging first PFM alignment element 60 protruding from a surface of PFM edge 56 and/or 58. In yet another embodiment of corner member 16, FE joining element 144 extends through first panel 102. While each first FE alignment element 142 and FE joining element 144 is illustrated as a cylindrical hole with a circular cross-section, alternate forms, shapes, cross-sections, etc., are considered as falling within the metes and bounds of the instant invention. In some embodiments of corner member 16, first FE alignment element 142 and FE joining element 144 are substantially similar to one another. In other embodiments of corner member 16, first FE alignment element 142 differs from FE joining element 144.

As illustrated in FIGS. 4A-4C, interior panel edge 114 and 134 are contiguous and, as such, form interior edge (IE) 146 of corner member 16. Similarly, IPE lips 120 and 140 are also contiguous and form IE lip 148. Interior edge 146 includes IE alignment element 150 and IE joining element 152. In an embodiment of corner member 16, IE alignment and joining elements 150 and 152 are respectively substantially similar to, and align with, CFM alignment and joining elements 80 and 82 when CFM edge 76 or 78 is placed in IE lip 148. Accordingly, IE alignment and joining elements 150 and 152 and CFM alignment and joining elements 80 and 82 facilitate the alignment and joining of corner member 16 and corner frame member 14 at free edge 112 and CFM edge 76 or 78. In some embodiments of corner member 16, IE alignment element 150 and IE joining element 152 are substantially similar to one another. In other embodiments of corner member 16, IE alignment element 150 differs from IE joining element 152.

In an embodiment of enclosure 10, first and second panels 102 and 104 of corner member 16 further include ribs to inhibit liquids, for example water, from entering enclosure 10. As illustrated in FIG. 4B, first panel 102 includes FE rib 154 extending from free edge 112 generally parallel with exterior surface 108, and between interior surface 106 and exterior surface 108. Similarly, second panel 104 includes FE rib 156 extending from free edge 132 generally parallel with exterior surface 128, and between interior surface 126 and exterior surface 128. Additionally, interior edge 146 of each corner member 16 includes IE rib 158 extending from interior edge 146 generally parallel with exterior surfaces 108 and 128, and between interior surfaces 106 and 126 and exterior surfaces 108 and 128.

In an embodiment of corner member 16, each free edge 112 and 132 also include at least one second FE alignment element 160 and 162 to further facilitate the alignment of corner member 16 and peripheral frame member 12. Each second FE alignment member 160 and 162 can be a hole or a hollow cylinder extending into corner member 16. Alternately, each second FE alignment element 160 and 162 can be a protrusion extending away from free edge 112 and 132, and configured for engagement in a mating receiver in peripheral frame member 12. All alternate embodiments of second FE alignment elements 160 and 162 are considered as falling within the spirit, scope and intent of the instant invention.

In an embodiment of corner member 16, exterior surface 108 of each first panel 102 includes outer nesting structure 164, and exterior surface 128 of each second panel 104 includes inner nesting structure 166. Outer and inner nesting structures 164 and 166 are sized and arranged such that when one enclosure 10a is stacked upon another enclosure 10b, two inner nesting structures 166 of upper enclosure 10a nest in two outer nesting structures 164 of lower enclosure 10b, and two inner nesting structures 166 of lower enclosure 10b nest in two outer nesting structures 164 of upper enclosure 10a. In an embodiment of enclosure 10, a first set of diagonally opposing corner members 16 on a first side of enclosure 10 each have outer nesting structures 164 and the second set of diagonally opposing corner members 16 on the first side of enclosure 10 each have inner nesting structures 166. One such arrangement is illustrated in FIG. 5.

Figure 5:
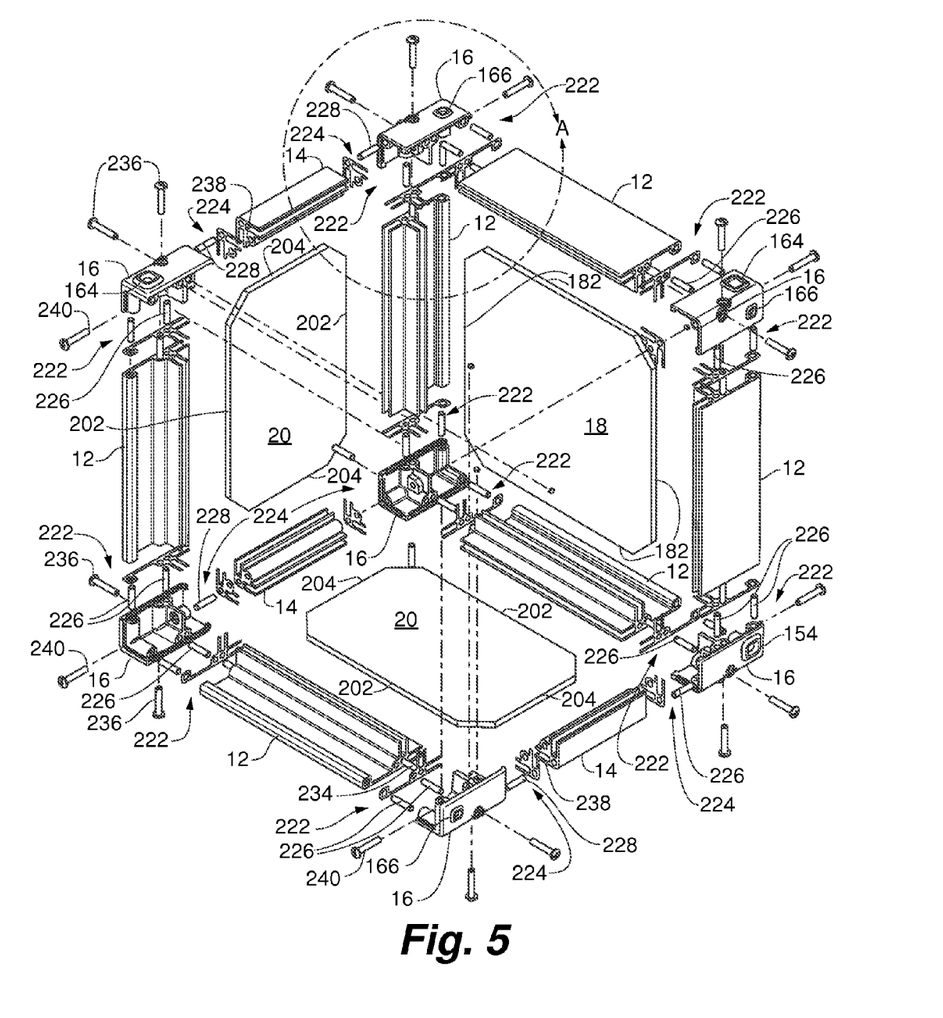
FIG. 5 is a detailed partial perspective view of an unassembled enclosure of FIG. 1.
Figure 6:
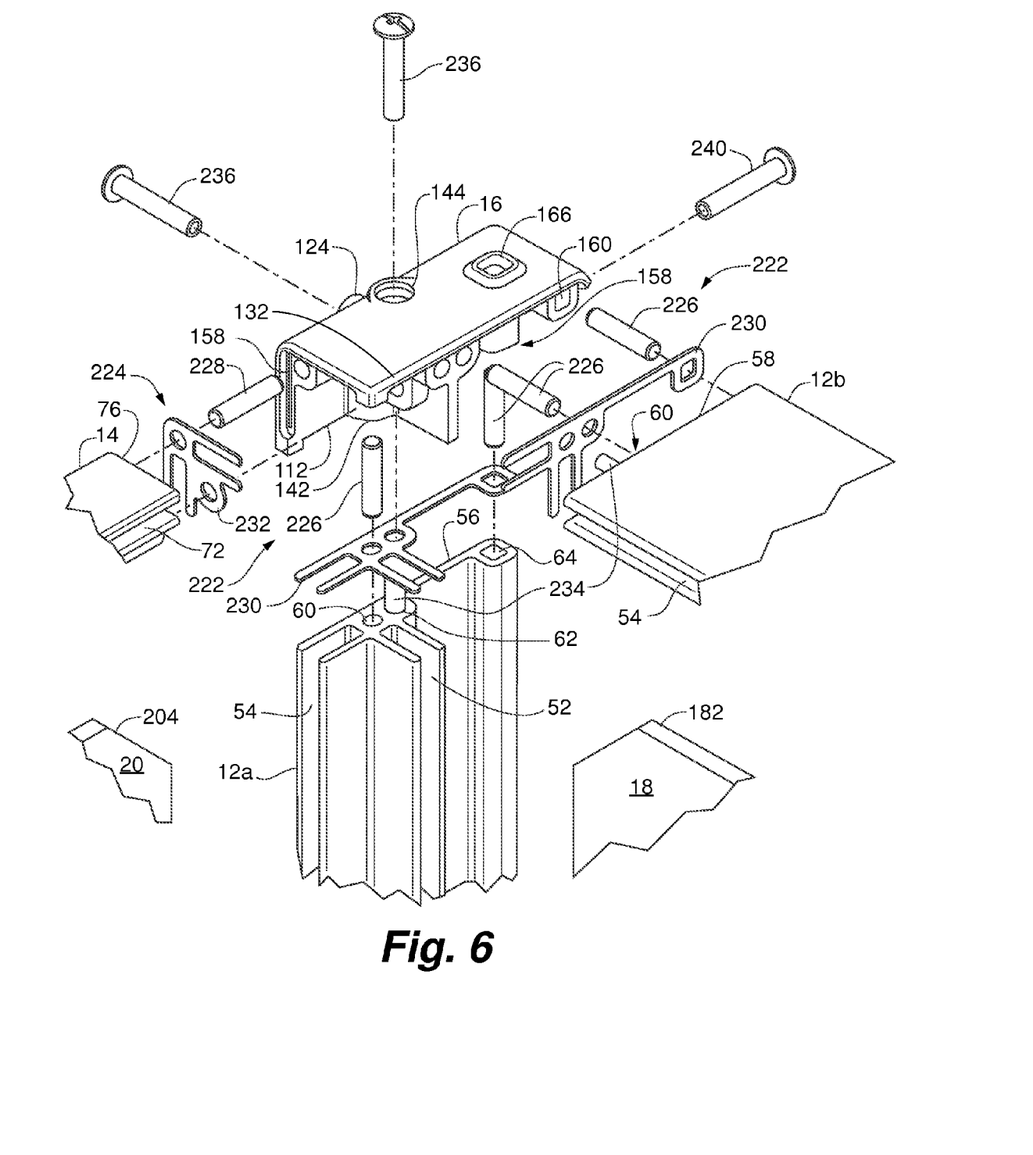
FIG. 6 is a detailed partial perspective view of an unassembled corner of the enclosure of FIG. 1.

FIG. 5 is a partial detailed perspective view of an unassembled enclosure 10 showing the various components thereof and their relationships with respect to each other, and FIG. 6 is a detailed partial view of the corner in circle "A" of FIG. 5. As illustrated, each primary surface sheet 18 includes four PSS edges 182 wherein each PSS edge 182 is configured for being received in first PFM channel 52 of peripheral frame member 12. As such, each primary surface sheet 18 can be joined to four peripheral frame members 12 to form a side of enclosure 10 with the four PSS edges 182 of each primary surface sheet 18 engaged in first PFM channels 52 of the corresponding four peripheral frame members 12. Also as shown, each secondary surface sheet 20 includes two SSS peripheral edges 202 and two SSS corner edges 204. Each SSS peripheral edge 202 is configured for being received in second PFM channel 54 of peripheral frame member 12, and each SSS corner edge 204 is configured for being received in CFM channels 72 and 74 of corner frame member 14. As such, each secondary surface sheet 20 can be joined to two peripheral frame members 12 and two corner frame members 14 to form another side of enclosure 10 with the two SSS peripheral edges 202 engaged in second PFM channels 54 of the corresponding two peripheral frame members 12 and the two SSS corner edges 204 engaged in one of CFM channels 72 or 74 of the corresponding two corner frame members 14.

Modifications can be made to the primary surface sheets 18 and/or the secondary surface sheets 20 based on the intended functionality of the enclosure 10. As noted, one or more of the sheets can include electrical components. In some embodiments, a video screen can be included in one or more of the sheets. In some embodiments, the video screen can be inserted directly into the respective channels, thereby eliminating a need for the corresponding sheet(s). Many variations are possible, depending on the intended functionality of the enclosure.

In an embodiment of enclosure 10, such as that illustrated in FIGS. 5 and 6, each corner member 16 is joined with two peripheral frame members 12 at respective peripheral junctions (PJ) 222 and with one corner frame member 14 at corner junction (CJ) 224. At each peripheral junction 222, PFM alignment pins 226 align the two first FE alignment elements 122 and 142 of each corner member 16 with first PFM alignment elements 60 in each of the corresponding peripheral frame member 12, and the two FE joining elements 124 and 144 are joined with PFM joining elements 62 in each of the corresponding peripheral frame member 12. When so joined, the two FE lips 118 and 138 of each corner member 16 will cover the respective peripheral junction 222 and inhibit liquids, for example water, from accessing the respective peripheral junction 222. At each corner junction 224, CFM alignment pins 228 align IE alignment element 150 of each corner member 16 with CFM alignment element 80 of the corresponding corner frame member 14, and IE joining element 152 of each corner member 16 is joined with CFM joining element 82 of the corresponding corner frame member 14. When so joined, IPE lips 120 and 140 of each corner member 16 will cover corner junction 224 and inhibit liquids, for example water, from accessing corner junction 224. To further inhibit liquids from accessing peripheral junction 222 and corner junction 224, an embodiment of enclosure 10 also includes sixteen PJ gaskets 230 and eight CJ gaskets 232. Each peripheral junction 222 includes one PJ gasket 230 positioned between the corresponding corner member 16 and peripheral frame member 12 such that FE ribs 154 and 156 press against PJ gasket 230. Similarly, each corner junction 224 includes one CJ gasket 232 positioned between the corresponding corner member 16 and corner frame member 14 such that IE rib 158 presses against CJ gasket 232. Some embodiments can include an FE rib and/or an IE rib without corresponding gaskets, meaning that the FE ribs press directly against PFM edges, and the IE ribs press directly against a CFM edge. Such embodiments can further inhibit liquid from entering the enclosure because of the compressibility of the ribs.

Inhibiting liquids from accessing the respective junctions can have significant importance in some preferred embodiments. Portable power distribution boxes (and other types of boxes) are often used outside and are expected to perform in a variety of weather conditions. The interior of portable power distribution boxes often house equipment that can be damaged if exposed to liquids. Thus, in such situations, it is prudent to take steps to inhibit liquid from entering the interior of the box—to make the box "rainproof." In most boxes, the junctions (seams between two components) are most susceptible to penetrating liquid. Accordingly, preferred embodiments of the present invention aim to inhibit water from accessing such junctions. The preferred structure for doing so involves lips on the corner members, as illustrated in the figures. But it should be understood that other structural configurations for inhibiting liquids from accessing the junctions are also within the scope of the present disclosure. For example, the peripheral frame members and/or the corner frame members can have lips that cover the respective junctions, a separate insert can be provided to cover the junctions, the gasket can have an exterior flange for covering the junction, and so on. In some embodiments, the enclosures can be liquid-tight enough to hold liquid in the inside of the enclosure.

As previously described in reference to FIGS. 2A-2C, and also as illustrated in FIG. 6, in some embodiments of peripheral frame member 12, first PFM alignment element 60 and PFM joining element 62, being functionally interchangeable, are used as such. For the purposes of describing an embodiment of enclosure 10, each PFM joining element 62 extending through peripheral frame member 12 between PFM edges 56 and 58 is referenced herein after as PFM passage 62. One such embodiment of peripheral frame member 12 is illustrated in FIG. 6, wherein PFM passage (or PFM joining element) 62 extends through peripheral frame member 12a at a location between first and second PFM alignment elements 60 and 64, respectively, and wherein PFM passage (or PFM joining element) 62 extends through peripheral frame member 12b at a location on PFM edge 58 away from both first and second PFM alignment elements 60 and 64, respectively, and adjacent second PFM channel 54. As will be apparent, in order to enable interchangeable use of first PFM alignment element 60 and PFM joining element 62, first PFM alignment element 60 must also extend through peripheral frame member 12 between PFM edges 56 and 58, and is referenced herein after as first PFM alignment passage 60. In some embodiments of enclosure 10, second PFM alignment element 64 extends through peripheral frame member 12 between PFM edges 56 and 58, and is referenced herein after as second PFM alignment passage 64.

Also as previously described in reference to FIGS. 4A-4C, and also as illustrated in FIG. 6, in some embodiments of corner member 16, FE joining element 124 extends through second panel 104, and FE joining element 124 extends through first panel 102. As such, FE joining elements 124 and 144 have a staggered relationship with respect to one another.

As shown in FIG. 6, corner member 16 is joined to peripheral frame member 12a using one PFM alignment pin 226 to align first PFM alignment element 60 with first FE alignment element 142 and using another PFM alignment pin 226 to align second PFM alignment element 64 with second FE alignment element 158. Additionally, PFM rod 234 extends through PFM passage 62. Each PFM fastener 236 extending through each FE joining element 144 in each corner member 16 at each PFM edge 56 and 58 of peripheral frame member 12a attaches to each end of PFM rod 234 for joining both FE joining elements 144 (and both corner members 16) with PFM joining element (or PFM passage) 62 at each PFM edge 56 and 58 of peripheral frame member 12a.

In some embodiments of enclosure 10, PFM alignment pin 226 is PFM alignment rod 226 extending through one or both first and second PFM alignment passages 60 and 64. Accordingly, a length of PFM alignment rod 226 is somewhat greater than the distance between PFM edges 56 and 58 such that at least a portion of PFM alignment rod 226 extends through a surface of each PFM edge 56 and 58. As will be apparent, each PFM alignment rod 226 functionally operates in substantially the same manner as each PFM alignment pin 226. As will be also apparent, PFM alignment rods 226 enhance the structural integrity of enclosure 10.

Corner member 16 is joined to peripheral frame member 12b in substantially the same manner noting that first PFM alignment element 60 and PFM passage (or PFM joining element) 62, being functionally interchangeable, are used as such because of the staggered relationship between FE joining elements 124 and 144. Each PFM fastener 236 extending through each FE joining element 124 in each corner member 12 at each PFM edge 56 and 58 of peripheral frame member 12b attaches to each end of PFM rod 234 for joining both FE joining elements 124 (and both corner members 16) with PFM joining element (or PFM passage) 62 at each PFM edge 56 and 58 of peripheral frame member 12b.

For aesthetic and/or other reasons, such as for preventing accumulation of dirt, debris, etc., the exposed heads of PFM fastener 236 are covered or hidden by placing one or more plugs or the like in the openings for FE joining elements 124 and 144, respectively, in exterior surfaces 128 and 108 of the corresponding second and first panels 104 and 102 of corner member 12.

In some embodiments of enclosure 10, CFM joining element 82 extends through corner frame member 14 between CFM edges 76 and 78, and is referenced hereafter as CFM passage 82. As previously described, CFM alignment element (or CFM alignment element) 80 aligns with IE alignment element 150 in corner member 16, and CFM passage (or CFM joining element) 82 aligns with IE joining element 152 in corner member 16. CFM rod 238 extends through CFM passage 82, and each CFM fastener 240 extends through each IE joining element 152 in each corner member 16 at each CFM edge 76 and 78 and attaches to each end of CFM rod 238 for joining both IE joining elements 152 (and both corner members 16) with CFM joining element (or CFM passage) 62 at each CFM edge 76 and 78 of corner frame member 14. The structural integrity of enclosure 10 can be particularly enhanced when each corner member 16 is joined with each corresponding peripheral frame members 12 and each corresponding corner frame member 14 by means of PFM rods 234 and CFM rods 238, respectively. The PFM rods 234, the CFM rods 238, and the corner members 16 form a wireframe structure with enhanced structural integrity. This configuration can also permit greater tightening of the joining elements, which can enhance the "rainproof" characteristics of many preferred embodiments.

In some embodiments of enclosure 10, CFM alignment element 80 extends through corner frame member 14 between CFM edges 76 and 78, and is referenced hereafter as CFM alignment passage 80. In some such embodiments of enclosure 10, CFM alignment pin 228 is CFM alignment rod 228 extending through CFM alignment passage 80. Accordingly, a length of CFM alignment rod 228 is somewhat greater than the distance between CFM edges 76 and 78 such that at least a portion of CFM alignment rod 228 extends through a surface of each CFM edge 76 and 78. As will be apparent, each CFM alignment rod 228 functionally operates in substantially the same manner as each CFM alignment pin 228. As will be also apparent, CFM alignment rods 228 enhance the structural integrity of enclosure 10.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. An enclosure comprising:
   (a) eight peripheral frame members, each peripheral frame member including (i) a first PFM channel, (ii) a second PFM channel, and (iii) two opposed PFM edges, each PFM edge including a first PFM alignment element and a PFM joining element;
   (b) four corner frame members, each corner frame member including (i) two CFM channels and (ii) two opposed CFM edges, each CFM edge including a CFM alignment element and a CFM joining element;
   (c) eight corner members, each corner member including (i) first and second panels that comprise (A) an interior surface, (B) an exterior surface, (C) a corner edge, (D) an opposed free edge, each free edge including a first FE alignment element and an FE joining element, (E) an interior panel edge, and (F) an exterior panel edge, and (ii) an interior edge formed by the interior panel edges of the first and second panels, the interior edge comprising (A) an IE alignment element and (B) an IE joining element;
   (d) two primary surface sheets, each including four PSS edges;
   (e) four secondary surface sheets, each including two SSS peripheral edges and two SSS corner edges;
   (f) sixteen peripheral junction covers; and
   (g) eight corner junction covers;
   wherein each corner member is joined with (i) two peripheral frame members at respective peripheral junctions, with (A) the two first FE alignment elements of each corner member being aligned with the first PFM alignment elements of the corresponding peripheral frame members and (B) the two FE joining elements being joined with the PFM joining elements of the corresponding peripheral frame members, and (ii) one corner frame member at a corner junction, with (A) the IE alignment element of each corner member being aligned with the CFM alignment element of the corresponding corner frame member and (B) the IE joining element of each corner member being joined with the CFM joining element of the corresponding corner frame member,
   wherein the peripheral junction covers cover the peripheral junctions to inhibit liquid from accessing the peripheral junctions, and the corner junction covers cover the corner junctions to inhibit liquid from accessing the corner junctions,
   wherein each primary surface sheet is joined with four peripheral frame members, with the four PSS edges of each primary surface sheet being in the first PFM channels of the corresponding four peripheral frame members, and
   wherein each secondary surface sheet is joined with two peripheral frame members and two corner frame members, with the two SSS peripheral edges being in the second PFM channels of the corresponding two peripheral frame members, and the two SSS corner edges each being in one of the CFM channels of the corresponding two corner frame members.

2. The enclosure of claim 1, wherein all eight peripheral frame members are the same length.

3. The enclosure of claim 1, wherein four peripheral frame members have a first length, and four peripheral frame members have a second length that differs from the first length.

4. The enclosure of claim 1, wherein alignment pins align (i) the two first FE alignment elements of each corner member with the first PFM alignment elements of the corresponding peripheral frame members and (ii) the IE alignment element of each corner member with the CFM alignment element of the corresponding corner frame member.

5. The enclosure of claim 1, wherein
each peripheral frame member further includes (iv) a PFM passage,
each corner frame member further includes (iii) a CFM passage,
a PFM rod extends through each PFM passage, and PFM fasteners attach to both ends of each PFM rod to join the FE joining elements with the PFM joining elements, and
a CFM rod extends through each CFM passage, and CFM fasteners attach to both ends of each CFM rod to join the IE joining elements with the CFM joining elements.

6. The enclosure of claim 1, wherein the corner members' (i) first FE alignment elements differ from the FE joining elements and (ii) IE alignment elements differ from the IE joining elements.

7. The enclosure of claim 1, wherein further comprising:
(h) sixteen PJ gaskets, each PJ gasket positioned in one of the peripheral junctions between the corresponding corner member and peripheral frame member to further inhibit liquid from accessing the peripheral junction, and
(i) eight CJ gaskets, each CJ gasket positioned in one of the corner junctions between the corresponding corner member and corner frame member to further inhibit liquid from accessing the corner junction.

8. The enclosure of claim 7, wherein:
each of the first and second panels of each corner member further includes (G) an FE rib extending from the free edge generally parallel with the exterior surface and between the interior surface and the exterior surface,
the interior edge of each corner member further includes (C) an IE rib extending from the interior edge generally parallel with the exterior surface and between the interior surface and the exterior surface,
each FE rib is pressed against one of the PJ gaskets to further inhibit liquid from accessing the corresponding peripheral junction, and
each IE rib is pressed against one of the CJ gaskets to further inhibit liquid from accessing the corresponding corner junction.

9. The enclosure of claim 1, wherein:
the exterior surface of each corner member's first panel includes an outer nesting structure,
the exterior surface of each corner member's second panel has an inner nesting structure, and
the inner and outer nesting structures are sized and arranged such that, when one enclosure is stacked upon another enclosure, two inner nesting structures of the upper enclosure nest in two outer nesting structures of the lower enclosure, and two inner nesting structures of the lower enclosure nest in two outer nesting structures of the upper enclosure.

10. The enclosure of claim 1, wherein:
each PFM edge of each peripheral frame member further includes a second PFM alignment element,
each free edge of each corner member further includes a second FE alignment element,
the two second FE alignment elements of each corner member are aligned with the second PFM alignment elements of the corresponding peripheral frame members.

11. The enclosure of claim 1, wherein one or more electrical components are included in one of the primary surface sheets and/or one of the secondary surface sheets, and the enclosure is for the temporary distribution of electrical power and/or data.

12. The enclosure of claim 1, wherein:
each peripheral junction cover comprises an FE lip integral with the free edge of one of the corner member's first or second panels, each FE lip extending from the free edge generally parallel with the exterior surface and near the exterior surface, and
each corner junction cover comprises a pair of IPE lips integral with the interior panel edges of the corner member's first and second panels, each IPE lip extending from the interior panel edge generally parallel with the exterior surface and near the exterior surface.

* * * * *